C. F. WALLACE & M. F. TIERNAN.
MEANS FOR INCREASING THE RATE OF SOLUBILITY OF GAS IN A LIQUID.
APPLICATION FILED NOV. 11, 1916.
1,285,494. Patented Nov. 19, 1918.
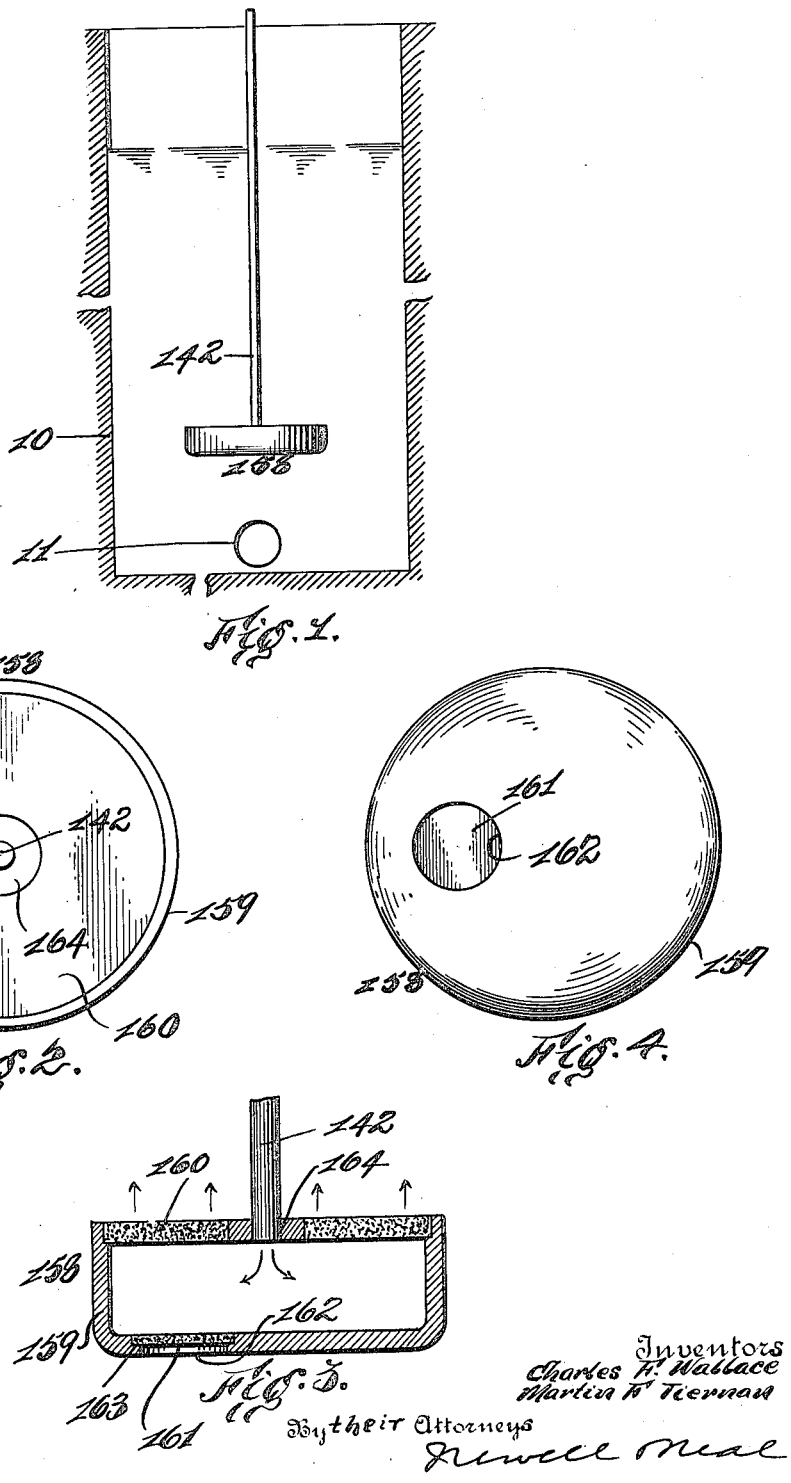
Inventors
Charles F. Wallace
Martin F. Tiernan
By their Attorneys

UNITED STATES PATENT OFFICE.

CHARLES F. WALLACE, OF NEW YORK, AND MARTIN F. TIERNAN, OF NEW ROCHELLE, NEW YORK.

MEANS FOR INCREASING THE RATE OF SOLUBILITY OF GAS IN A LIQUID.

1,285,494. Specification of Letters Patent. Patented Nov. 19, 1918.

Original application filed March 26, 1915, Serial No. 17,122. Divided and this application filed November 11, 1916. Serial No. 130,757.

*To all whom it may concern:*

Be it known that we, CHARLES F. WALLACE and MARTIN F. TIERNAN, citizens of the United States, residing at Tompkinsville, borough of Richmond, city and State of New York, and New Rochelle, county of Westchester and State of New York, respectively, have invented certain new and useful Improvements in Means for Increasing the Rate of Solubility of Gas in a Liquid, of which the following is a clear, full, and exact description.

This invention relates to means for increasing the rate of solubility of a gas in a liquid, and one of the objects is to provide means for introducing an oxidizing or reducing gas into a body of water to be purified in a manner, for example, as shown in our application filed March 26th, 1915, Serial Number 17,122, of which this application is a division.

Another object of the invention is to secure the distribution and the quick solubility of chlorin gas under pressure in water. Other objects of the invention are to provide simple and efficient means for diffusing gas in a liquid such as water.

These being among the objects of the present invention, the same consists of certain features of construction and combinations of parts to be hereinafter described and then claimed with reference to the accompanying drawings illustrating a desirable embodiment of the invention, in which—

Figure 1 is a vertical section of a well or tank in which the improved gas diffusing device is introduced;

Fig. 2 is an enlarged top plan of the diffuser itself;

Fig. 3 is a diametrical section thereof; and

Fig. 4 is a bottom plan.

The improved means for increasing the rate of solubility of a gas in a liquid is preferably used for applying chlorin gas to water to be purified, and may be located at any desirable point of application to the water, whether flowing through a water main or whether the water be in any other container or conduit. The diffuser may, for example, also be positioned at the point of application of the gas to water, as in the system shown and described in our said application.

In the embodiment shown in the accompanying drawings, the tank or well 10 is provided with a submerged orifice 11, through which the water in, or supplied to, the tank or well passes after purification. Dipping into the body of water in the tank or well 10 is a tube 142 through which chlorin gas passes from the control apparatus, said tube being preferably of silver so that when chlorin gas is passed therethrough it will not be attacked by the chlorin. The chlorin diffusing device is attached to the lower end of said tube, preferably at a point above the fixed orifice 11.

The said diffusing device consists of a hollow head 158 comprising a cup or dished body 159, which may be composed of earthenware material such as porcelain. The upper part of the dished body 159 is closed partly by a top plate or disk 160 which is composed of spongiform porous material such as carborundum, emery, alundum, or the like, of fine porosity, while there is a bottom closure disk 161 of similar material but of finer porosity than that of the upper disk 160. The smaller bottom disk is placed over the bottom aperture 162 of the dished body 159, the wall of which is provided with a peripheral groove to furnish a seat 163 for disk 161. Preferably the silver tubing 142 is connected with the hollow head of the diffusing device by means of a silver bushing 164.

The operation of the described chlorin diffusing device is as follows: The head 158 is immersed in water, and as soon as the water strikes the porous disks, the pores thereof take up water and become saturated because of capillary action. The gas under pressure, passing into said head from the tube 142 is forced up through the pores of the upper disk 160, against the capillary attraction of the water, in very minute bubbles, whereby the chlorin gas is diffused into the body of water surrounding the diffusing head. As these bubbles are in the act of passing through the upper porous disk 160, they take up a certain amount of the water and reach the main body of water to be purified, in a practically saturated condition, where because of this saturation and the fineness of the bubbles they go into solution immediately over the comparatively large upper surface of the porous upper disk. If said disk were dry, the chlorin gas would go through in comparatively large bubbles in a dry state and would be less easily dissolved. The lower porous disk 161 allows any water which may collect in the dished body 159 to be forced through the said disk. When the interior of the hollow body 158 contains no water, no gas will escape through the lower porous disk 161 for the reason that this disk being of a finer degree of porosity than the upper disk, offers more resistance to the passage of the gas; also, this disk being at a lower level than the upper disk, would require a greater pressure to force gas through it from the same source.

It is obvious that the invention is susceptible of modification, as parts may be omitted, parts added, and parts substituted without departing from the spirit and scope thereof as expressed in the claims.

What we claim as new is:—

1. Means for increasing the rate solubility of an oxidizing or reducing gas in a body of liquid, or the like, comprising in combination a hollow body adapted for immersion in the body of liquid, a gas inlet entering the same, and an extended gas outlet composed of a porous body such as carborundum set in the top of the same and permeable to gas under pressure.

2. Means for increasing the rate of solubility of an oxidizing or reducing gas in a liquid, or the like, comprising in combination, a hollow head provided with an inlet for gas, and outlet means consisting of a porous body carried by the upper open part of said head, and secondary outlet means at the bottom of said head, consisting of a porous body having a finer porosity than aforesaid porous body.

Signed at New York, N. Y., this 8th day of November, 1916.

CHARLES F. WALLACE.
MARTIN F. TIERNAN.

Witness:
ABRAM BERNSTEIN.